Dec. 29, 1959

P. S. ROLLER 2,919,235

ELECTROLYTIC METHOD AND APPARATUS FOR THE
PRODUCTION OF METAL HYDROXIDE

Filed Nov. 6, 1956

INVENTOR
Paul S. Roller.

BY

ATTORNEY

United States Patent Office

2,919,235
Patented Dec. 29, 1959

2,919,235

ELECTROLYTIC METHOD AND APPARATUS FOR THE PRODUCTION OF METAL HYDROXIDE

Paul S. Roller, Washington, D.C.

Application November 6, 1956, Serial No. 620,746

3 Claims. (Cl. 204—96)

This invention relates to improvements in the electro-chemical generation of metal hydroxide from metal electrodes and, in particular, to the electro-chemical generation of aluminum or iron hydroxide in regard to purification of liquids.

This invention is concerned with a modification of the basic invention disclosed in my application Serial No. 615,218, filed October 8, 1956, which is a continuation-in-part of application Serial No. 200,775, filed December 14, 1950, now abandoned.

The principal object of the present invention is to provide a method and means for preventing the formation of films and deposits on the electrodes during the electrolytic generation, and also for the removal of such films and deposits, as a result of which the rate of voltage rise with time is reduced and the electro-chemical yield of metal hydroxide is maintained. It is particularly intended that the prevention and removal shall apply to a soft gel film occurring on the electrodes before it has crusted and hardened thereon as I have explained in the aforementioned application, and in like manner to any other formation, such as an oxide film, before it has crystallized and hardened.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing, wherein like reference characters indicate like parts throughout the several figures and in which:

Figure 1:
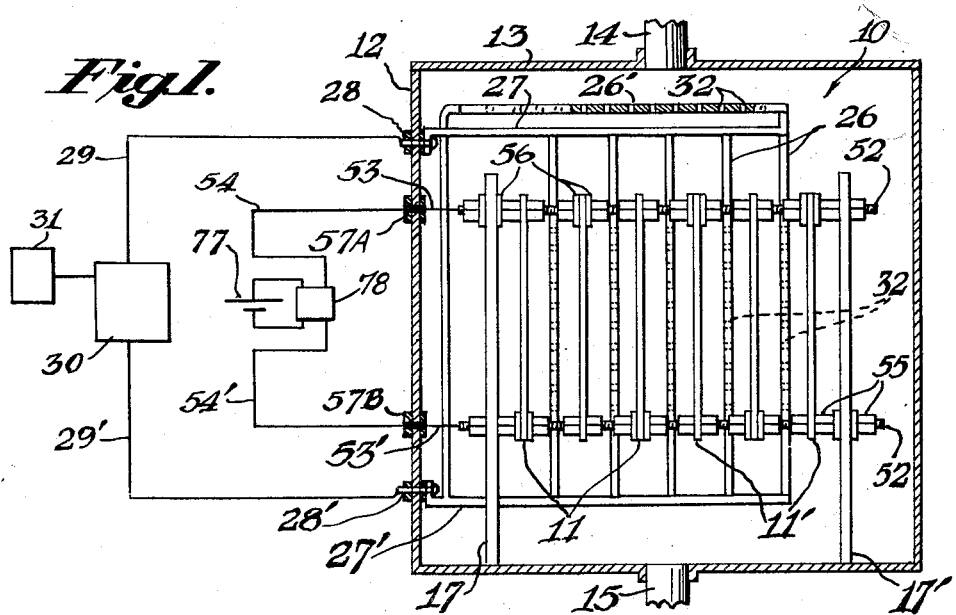
Fig. 1 is a cross-sectional view taken vertically through a cell of metal electrodes and included electrolytic liquid combined with ultrasonic elements for reaction upon the electrodes through the liquid medium.

Referring now to the drawing, specifically to Fig. 1, an electrolytic cell, in accordance with the present invention comprises a cell 10 including an assembly of electrodes 11 and 11' housed within a casing 12 having a cover 13, an inlet 14 and an outlet 15. The electrodes 11 are electrically joined together by a common lead 53, which is connected to an insulated terminal 57A in said casing. The electrodes 11' are similarly connected to a common lead 53' that is connected to an insulated terminal 57B in said casing. A power source 77, preferably a direct current output unit such as a rectifier or a motor-generator set, supplies electrolytic current to the cell by way of leads 54 and 54' connected to the terminals 57A and 57B. A current reversing means 78, as more particularly described in copending application, Serial No. 274,120, filed February 29, 1952, and now Patent No. 2,860,090, for periodically reversing the direction of the current to said electrodes is included in the circuit beyond power source 77.

Electrode plates 11 and 11' are mechanically connected to form a rigid assembly by threaded studs 52 and tight-pressed nuts 55, each said stud making electrical contact with alternate plates through the interposition of insulators 56 at alternate plates as fully described in my aforementioned application. The plate assembly is terminated by supports 17, 17' which may rest on the insulated floor of the casing 12 or may be otherwise fastened to said casing.

High frequency piezoelectric sound wave propagation elements or transducers 26 are situated between each pair of adjacent plates 11 and 11', and are connected to well-insulated bus bar leads 27 and 27' which are attached at their other ends to terminals 28 and 28' on casing 12. Lead wires 29 and 29' originating at said terminals 28, 28' are connected to an oscillator 30 which is an electronic assembly capable of generating high frequency current. A timer 31 preferably is included in the oscillator circuit as will be hereinafter described.

The piezoelectric transducers 26 are supported in place midway between the electrode plates 11 and 11' and the support for this purpose may be the insulated bus bar conductors 27 and 27', or any other suitable support may be provided in conjunction with casing 12, said support being preferably of phenolic-laminate insulating material. Transducers 26 convert the high frequency current from oscillator 30 into high frequency sound waves. The transducer consists of any suitable piezoelectric converter such as quartz, but is preferably barium titanate in view of its relatively low voltage requirement and the ease of its construction by ceramic casting. Said transducers are provided throughout their area with openings or perforations 32 which permit the electrolytic current to pass from adjacent electrodes 11 to 11' and vice versa. A similar piezoelectric transducer 26 may also be mounted above or below the cell transversely and proximal thereto, in which case the ultrasonic waves are propagated substantially parallel to the surface of electrode plates 11 and 11'.

Figure 2:
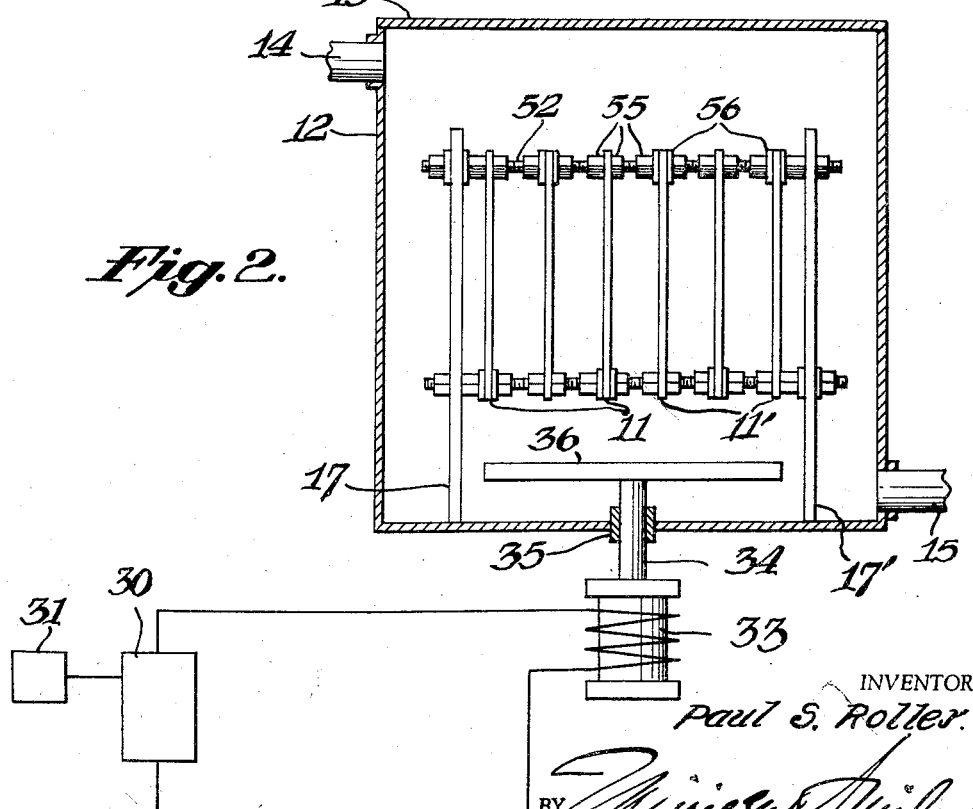
Fig. 2 is a cross-sectional view of an apparatus having a modified form of ultrasonic element.

In another mode of generating the acoustic waves, as shown in Fig. 2, the sound propagation element comprises a magnetostrictive rod or transducer 33 in circuit with the oscillator 30 and is attached to a coupler 34 which passes through a suitable liquid-tight sleeve 35 in a wall of the case 12 and may be attached to and terminated by a coupler plate 36 within the case 12 and spanning the assembly of electrode plates 11, 11'. The magnetostrictive rod or transducer 33, coupler 34, and coupler plate 36 may also be contained in the case 12 if suitably insulated and supported. Oscillating electric power applied to the transducer 33 causes ultrasonic waves to be propagated in the liquid electrolyte within said case in a direction substantially parallel to the surface of the electrode plates 11 and 11'.

In the operation of the invention when electrolytic current is passed from generator 77 to the cell of electrodes 11 and 11', metal hydroxide generated at the anode, for example at electrodes 11, electrodes 11' being cathode, passes into the liquid electrolyte. Generally it is preferred to periodically reverse the current so that electrodes 11 and 11' are alternately anode and cathode. During passage of the electrolytic current, the electrical pulses from oscillator 30 drive transducers 26 and similarly the pulses from oscillator 30 drive transducer 33, to produce sound waves in the cell liquid. The ultrasonic waves act against the surface of electrodes 11 and 11' and thereby cause the removal of insulating deposits, coatings and hydroxide films thereon. The ultrasonic waves act, in fact, through the medium of cavitation or bursts in the liquid electrolyte, particularly at the surface of electrode plates 11 and 11'. Such bursts are similar to powerful transverse hydraulic jets, and are to be distinguished from the flowing of liquid electrolyte or water past the cells which is merely of the nature of a glide past the electrode surfaces. Flow of electrolyte is quite ineffectual for the removal of films and deposits from the electrodes even at impracticably high velocities.

The ultrasonic frequency may vary between five thousand and one million cycles per second. The cavitation is independent of the frequency, but increases with amplitude of the vibrations. Increase in frequency improves the directivity of the propagation.

Due to erosion and possible destruction of electrode plates 11 and 11' by the cavitation, I prefer to limit the ultrasonic power input to as low a value as possible. Also, for the same reason, I prefer to generate the ultrasonic waves in the liquid electrolyte intermittently, employing short duration wave propagations or pulses at intervals which may be relatively long while electrolytic generation is taking place continuously. Thus the ultrasonic wave may be generated for from one second to one minute every one to sixty minutes, generally preferably for about ten seconds each ten minutes. The timer 31, in the respective oscillator circuit, is adapted to provide the desired periodic short times of wave propagation during continuous electrolytic generation.

The employment of ultrasonic wave propagation in combination with electrolytic generation of metal hydroxide is made practicable by taking advantage of the existence of a soft gel film preceding and converting into a hard, difficult crust, as I have disclosed in the aforementioned application. The removal of the commonly observed hardened coatings or crusts by ultrasonic waves is most difficult and generally would not be considered feasible except perhaps in combination with a solvent such as dilute muriatic acid. However, fortified with the knowledge of a soft gel film preceding the crust, the direct application of ultrasonics then comes into consideration as being feasible, and is feasible in the particular manner and by the particular means as hereinabove described. Further, as regards the periodic application of ultrasonics, the time interval of 1 to 60 minutes between pulses is sufficiently short so that no significant hardening of the gel film takes place between the succession of pulses.

As an illustrative example but without being necessarily restricted thereto or to the particular insoluble metal hydroxide referred to, aluminum hydroxide is generated into flowing river water with aluminum electrodes made alternately anode and cathode through periodic polarity reversal means. The initial voltage, depending upon the hardness of the water, is three to eight volts at a current input of seven amps. After about two hours of generation, the voltage required to pass this current increases, at first slowly and then more rapidly. After twenty hours the voltage becomes three to four times as great as initially, and the yield of aluminum hydroxide greatly falls off. At this time, the plates are found to be coated with aluminum hydroxide containing included foreign matter. In another similar test but with ultrasonic waves generated periodically in the water in the manner as hereinabove described, employing a barium titanate transducer and 50 watts of R.F. power input at 70,000 cycles, the voltage after 24 hours will have risen only about 20% and the yield of aluminum hydroxide is the same as initially. The favorable low voltage and high yield are substantially maintained during continued electrolytic generation.

Although certain specific embodiments of the invention have been shown and described, it is obvious that many modifications thereof are possible. The invention, therefore, is not to be restricted except insofar as is necessitated by the prior art and by the spirit and scope of the appended claims.

Having thus described my invention I claim:

1. The method of electrolytic generation of insoluble metal hydroxide from metal electrodes and an aqueous liquid non-solvent to the metal hydroxide, which comprises producing metal hydroxide in the electrolyte by passing electrolytic current across the electrodes, and generating ultrasonic waves in the aqueous liquid, whereby the electrodes are freed of soft insulating films before hardening thereof and the efficiency of the electrolytic generation is prolonged.

2. The method of electrolytic generation of insoluble metal hydroxide from metal electrodes and an aqueous liquid non-solvent to the metal hydroxide, which comprises producing metal hydroxide in the electrolyte by passing electrolytic current across the electrodes, and generating ultrasonic waves for short duration at intervals, whereby the electrodes are freed of soft insulating films before hardening thereof and the efficiency of the electrolytic generation is prolonged.

3. The method of electrolytic generation of insoluble metal hydroxide from metal electrodes and an aqueous liquid non-solvent to the metal hydroxide, which comprises producing metal hydroxide in the electrolyte by passing electrolytic current across the electrodes while generating ultrasonic waves in pulses at intervals, the intervals being sufficiently short that soft gel films formed on the electrodes have not hardened between the pulses, whereby crusted coatings are prevented on the electrodes and the efficiency of the electrolytic generation is prolonged.

References Cited in the file of this patent

UNITED STATES PATENTS

| | | |
|---|---|---|
| 1,146,942 | Landreth | July 20, 1915 |
| 1,478,714 | Landreth | Dec. 25, 1923 |
| 1,965,399 | Wehe | July 3, 1934 |
| 2,470,741 | Gordon | May 17, 1949 |
| 2,744,860 | Rines | May 8, 1956 |